US008869305B1

(12) United States Patent
Huang

(10) Patent No.: US 8,869,305 B1
(45) Date of Patent: Oct. 21, 2014

(54) SYSTEMS AND METHODS FOR IMPLEMENTING PASSWORD-PROTECTION POLICIES BASED ON PHYSICAL LOCATIONS OF MOBILE DEVICES

(75) Inventor: Ge Hua Huang, Bejing (CN)

(73) Assignee: Symantec Corporation, Mountain View, CA (US)

( * ) Notice: Subject to any disclaimer, the term of this patent is extended or adjusted under 35 U.S.C. 154(b) by 17 days.

(21) Appl. No.: 13/240,929

(22) Filed: Sep. 22, 2011

(51) Int. Cl.
*G06F 21/00* (2013.01)
*H04L 29/06* (2006.01)
*G06F 21/62* (2013.01)
*G06F 21/60* (2013.01)

(52) U.S. Cl.
CPC .......... *H04L 63/107* (2013.01); *G06F 21/6245* (2013.01); *G06F 21/604* (2013.01)
USPC ............................................ 726/29; 380/258

(58) Field of Classification Search
None
See application file for complete search history.

(56) References Cited

U.S. PATENT DOCUMENTS

2010/0056055 A1* 3/2010 Ketari ........................ 455/41.3
2011/0225625 A1* 9/2011 Wolfson et al. .................. 726/1
2012/0174237 A1* 7/2012 Krzyzanowski ................ 726/29

\* cited by examiner

*Primary Examiner* — Gilberto Barron, Jr.
*Assistant Examiner* — Simon Kanaan
(74) *Attorney, Agent, or Firm* — ALG Intellectual Property, LLC

(57) ABSTRACT

A computer-implemented method may include maintaining a set of password-protection policies configured to prevent unauthorized access to a mobile device at different physical locations. The computer-implemented method may also include identifying a current physical location of the mobile device and searching a database that stores the set of password-protection policies for a particular password-protection policy that corresponds to the current physical location of the mobile device. The computer-implemented method may further include identifying, based on the search of the database, the particular password-protection policy that corresponds to the current physical location of the mobile device and then implementing the particular password-protection policy on the mobile device in response to the identification of the particular password-protection policy. Various other methods, systems, and computer-readable media are also disclosed.

19 Claims, 7 Drawing Sheets

SYSTEMS AND METHODS FOR IMPLEMENTING PASSWORD-PROTECTION POLICIES BASED ON PHYSICAL LOCATIONS OF MOBILE DEVICES

BACKGROUND

In today's world of vast computing technology, many technology users are concerned with protecting the privacy and integrity of their computing devices. In an effort to address such concerns, some users may configure their computing devices to require entry of a password. For example, a user may configure a mobile phone to require entry of a password before the user is able to make a phone call with and/or access any data stored on the mobile phone. By requiring entry of a password, mobile phone owners may prevent illegitimate users from using the mobile phone to communicate with others under the guise of the owner's identity and/or may prevent access to private information stored on the mobile phone.

Unfortunately, many existing password technologies suffer from one or more shortcomings and/or inefficiencies that may frustrate users and even discourage users from implementing such password technologies on their computing devices. For example, an existing password technology implemented on a mobile phone may operate in a static manner by requiring entry of a password regardless of any conditions or circumstances. In this example, a legitimate user may be unable to bypass this password requirement even if the circumstances strongly suggest that the access attempt is legitimate. What is needed, therefore, is an efficient and effective mechanism for dynamically determining whether to require entry of a password before allowing users to access certain contents and/or features of computing devices.

SUMMARY

As will be described in greater detail below, the instant disclosure generally relates to systems and methods for implementing password-protection policies based on physical locations of mobile devices. In some examples, a computerized method for implementing such password-protection policies may include 1) maintaining a set of password-protection policies configured to prevent unauthorized access to a mobile device at different physical locations, 2) identifying a current physical location of the mobile device, 3) searching a database that stores the set of password-protection policies for a particular password-protection policy that corresponds to the current physical location of the mobile device, 4) identifying, based on the search of the database, the particular password-protection policy from the set of password-protection policies that corresponds to the current physical location of the mobile device, and 5) implementing the particular password-protection policy on the mobile device in response to the identification of the particular password-protection policy that corresponds to the current physical location of the mobile device.

In some examples, the set of password-protection policies may include at least one password-protection policy configured to prevent unauthorized access to the mobile device by requiring entry of a known password when the mobile device is located at an untrusted physical location. The set of password-protection policies may also include at least one password-protection policy configured to facilitate access to the mobile device without requiring entry of a password when the mobile device is located at a trusted physical location.

In some examples, the untrusted physical location may represent a public location, an unknown location, and/or a known location that is not trusted by a user of the mobile device. In addition, the trusted physical location may represent a home of a user of the mobile device, a workplace of the user of the mobile device, a location that is physically proximate to the user of the mobile device, and/or a known location that is trusted by the user of the mobile device.

In some examples, the method may further include detecting a wireless network associated with a trusted physical location and then determining that the mobile device is connected to the wireless network associated with the trusted physical location. In other examples, the method may include obtaining geographical coordinates that identify the current physical location of the mobile device. In such examples, the method may also include identifying a geographical area associated with the particular password-protection policy and then determining that the obtained geographical coordinates indicate that the mobile device is located within the geographical area associated with the particular password-protection policy.

In further examples, the method may include detecting a Bluetooth headset associated with a user of the mobile device and determining that the mobile device is connected to the Bluetooth headset associated with the user of the mobile device. In such examples, the method may also include determining, based on the connection between the mobile device and the Bluetooth headset, that the mobile device is located physically proximate to the user. In additional examples, the method may include detecting a wireless network associated with an untrusted physical location and then determining that the mobile device is connected to the wireless network associated with the untrusted physical location.

In some examples, the method may further include verifying that the mobile device is located at a trusted physical location by: 1) identifying at least one trusted physical location associated with the particular password-protection policy, 2) comparing the current physical location of the mobile device with the trusted physical location associated with the particular password-protection policy, and then 3) determining, based on the comparison, that the current physical location of the mobile device corresponds to the trusted physical location associated with the particular password-protection policy. In such examples, the method may include implementing the particular password-protection policy that corresponds to the trusted physical location. The method may also include, upon implementing the particular password-protection policy that corresponds to the trusted physical location, enabling a user to access at least a portion of the mobile device without requiring entry of a password.

In other examples, the method may further include verifying that the mobile device is located at an untrusted physical location by: 1) identifying at least one untrusted physical location associated with the particular password-protection policy, 2) comparing the current physical location of the mobile device with the untrusted physical location associated with the particular password-protection policy, and then 3) determining, based on the comparison, that the current physical location of the mobile device corresponds to the untrusted physical location associated with the particular password-protection policy. In such examples, the method may include implementing the particular password-protection policy that corresponds to the untrusted physical location. The method may also include, upon implementing the particular password-protection policy that corresponds to the untrusted physical location, requiring entry of a known password before a user is allowed to access at least a portion of the mobile device.

In some examples, the method may further include receiving input from a user of the mobile device and identifying a particular physical location based at least in part on the input received from the user of the mobile device. In such examples, the method may also include identifying a particular password-protection policy within the database that stores the set of password-protection policies based at least in part on the input received from the user of the mobile device and then updating the database that stores the set of password-protection policies to indicate that the mobile device is to implement the particular password-protection policy when the mobile device is located at the particular physical location.

According to some embodiments, the method described above may be implemented as a system that includes a policy-provisioning module programmed to maintain a set of password-protection policies configured to prevent unauthorized access to a mobile device at different physical locations. In such embodiments, the system may also include a policy-enforcement module programmed to: 1) identify a current physical location of the mobile device, 2) search a database that stores the set of password-protection policies for a particular password-protection policy that corresponds to the current physical location of the mobile device, 3) identify, based on the search of the database, the particular password-protection policy from the set of password-protection policies that corresponds to the current physical location of the mobile device, and 4) implement the particular password-protection policy on the mobile device in response to the identification of the particular password-protection policy that corresponds to the current physical location of the mobile device.

According to other embodiments, the method described above may be implemented on a computer-readable-storage medium that includes one or more computer-executable instructions that, when executed by at least one processor of a computing device, cause the computing device to: 1) maintain a set of password-protection policies configured to prevent unauthorized access to a mobile device at different physical locations, 2) identify a current physical location of the mobile device, 3) search a database that stores the set of password-protection policies for a particular password-protection policy that corresponds to the current physical location of the mobile device, 4) identify, based on the search of the database, the particular password-protection policy from the set of password-protection policies that corresponds to the current physical location of the mobile device, and 5) implement the particular password-protection policy on the mobile device in response to the identification of the particular password-protection policy that corresponds to the current physical location of the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
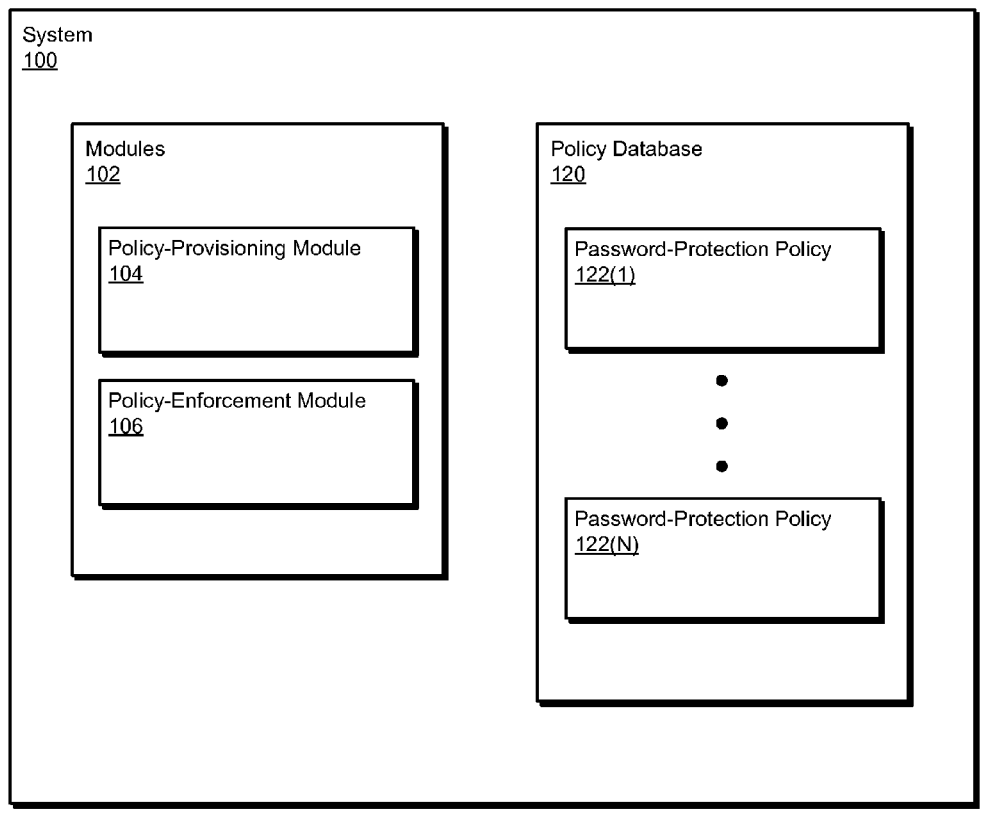
FIG. 1 is a block diagram of an exemplary system for implementing password-protection policies based on physical locations of mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for implementing password-protection policies based on physical locations of mobile devices. In one example, a user of a mobile device may configure the mobile device to require entry of a password before the user is able to access the mobile device. However, instead of always requiring entry of the password before the user is able to access the mobile device, the mobile device may only require entry of the password at certain locations. For example, the mobile device may be configured to require entry of the password when the mobile device is located at an untrusted physical location but not require entry of the password when the mobile device is located at a trusted physical location.

Figure 2:
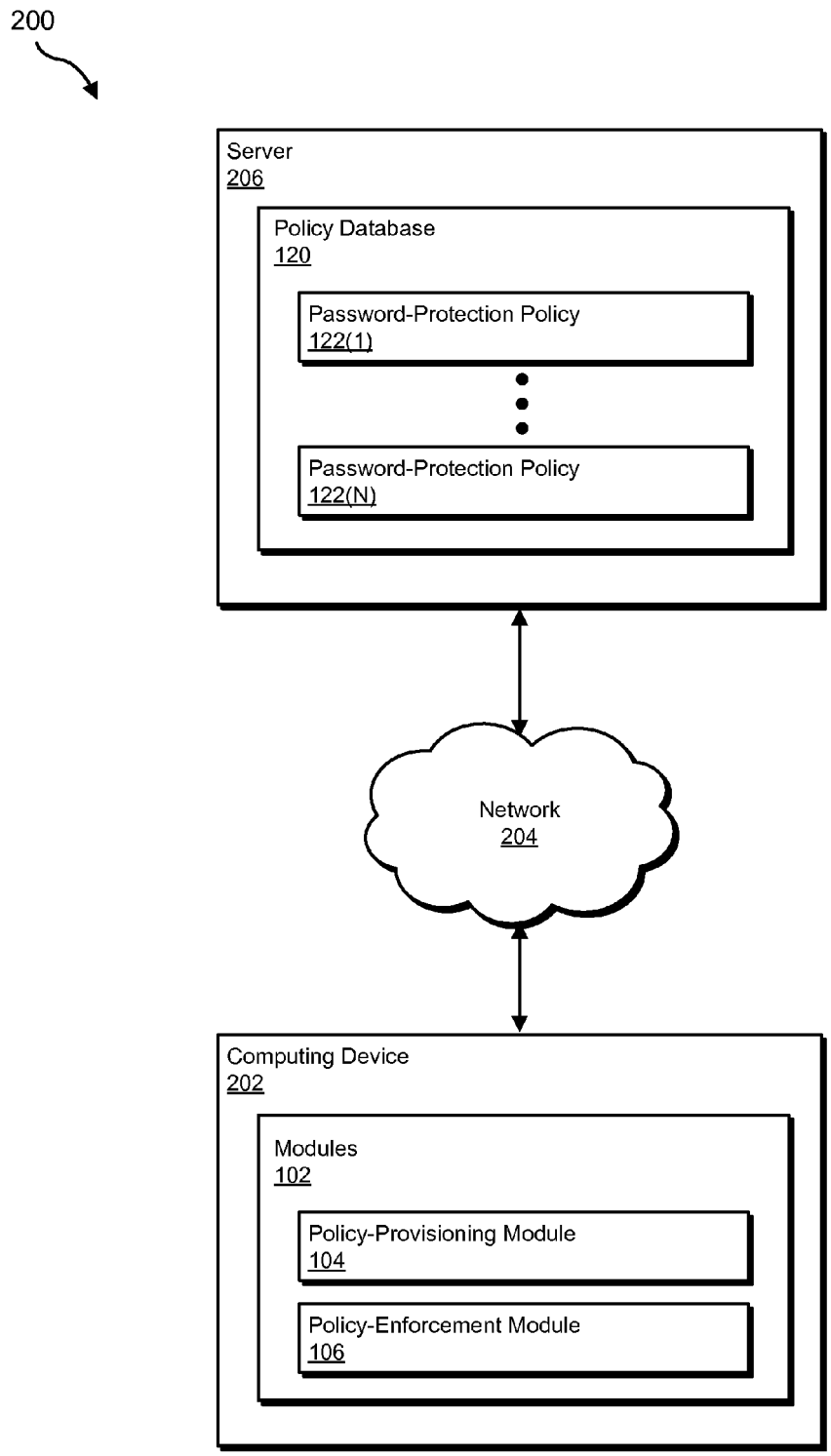
FIG. 2 is a block diagram of an exemplary system for implementing password-protection policies based on physical locations of mobile devices.

The following will provide, with reference to FIGS. 1-2, detailed descriptions of exemplary systems for implementing password-protection policies based on physical locations of mobile devices. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for implementing password-protection policies based on physical locations of mobile devices. As illustrated in this figure, exemplary system 100 may include one or more modules 102 for performing one or more tasks. For example, and as will be explained in greater detail below, exemplary system 100 may include a policy-provisioning module 104 programmed to maintain a set of password-protection policies configured to prevent unauthorized access to a mobile device at different physical locations. Exemplary system 100 may also include a policy-enforcement module 106 programmed to identify a current physical location of the mobile device and search a database that stores the set of password-protection policies for a particular password-protection policy that corresponds to the current physical location of the mobile device.

As will be described in greater detail below, policy-enforcement module 106 may also be programmed to identify the particular password-protection policy that corresponds to the current physical location of the mobile device based on the search of the database and then implement the particular password-protection policy on the mobile device in response to the identification of the particular-password policy. Although illustrated as separate elements, one or more of modules 102 in FIG. 1 may represent portions of a single module or application (such as a security application).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as policy database 120. In one example, policy database 120 may be configured to store one or more policies associated with preventing unauthorized access to certain contents and/or features of computing device 202. For example, policy database 120 may store password-protection policies 122(1)-(N) that are configured to prevent unauthorized access to computing device 202 at different physical locations.

Policy database 120 may represent portions of a single database or computing device or a plurality of databases or computing devices. For example, policy database 120 may represent a portion of computing device 202 in FIG. 2, computing system 610 in FIG. 6, and/or portions of exemplary network architecture 700 in FIG. 7. Alternatively, policy database 120 in FIG. 1 may represent one or more physically separate devices capable of being accessed by a computing device, such as computing device 202 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In addition, system 200 may include one or more of modules 102 stored as part of computing device 202 and policy database 120 stored as part of server 206.

In one embodiment, one or more of modules 102 from FIG. 1 may, when executed by at least one processor of computing device 202, enable computing device 202 to implement password-protection policies based on physical locations of mobile devices. For example, and as will be described in greater detail below, policy-provisioning module 104 may cause computing device 202 to maintain password-protection policies 122(1)-(N) configured to prevent unauthorized access to computing device 202 at different physical locations.

In addition, policy-enforcement module 106 may cause computing device 202 to identify a current physical location of computing device 202 and search policy database 120 that stores password-protection policies 122(1)-(N) for a particular password-protection policy that corresponds to the current physical location of computing device 202. Policy-enforcement module 106 may also cause computing device 202 to identify the particular password-protection policy that corresponds to the current physical location of computing device 202 based on the search of policy database 120 and then implement the particular password-protection policy on computing device 202 in response to the identification of the particular-password policy.

Computing device 202 generally represents any type or form of computing device capable of reading computer-executable instructions. Examples of computing device 202 include, without limitation, laptops, cellular phones, personal digital assistants (PDAs), multimedia players, combinations of one or more of the same, exemplary computing system 610 in FIG. 6, or any other suitable computing device. In various embodiments, computing device 202 may represent a mobile device capable of being moved from one physical location to another physical location.

Server 206 generally represents any type or form of computing device capable of storing and/or facilitating access to at least one database that stores a set of password-protection policies (such as password-protection policies 122(1)-(N) stored in policy database 120). Examples of backup server 206 include, without limitation, application servers, web servers, and database servers configured to provide various database services and/or run certain software applications.

While shown as part of server 206, all or a portion of policy database 120 may be located on computing device 202. Similarly, all or a portion of the functionality provided by policy-provisioning module 104 may be performed by server 206 instead of computing device 202.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
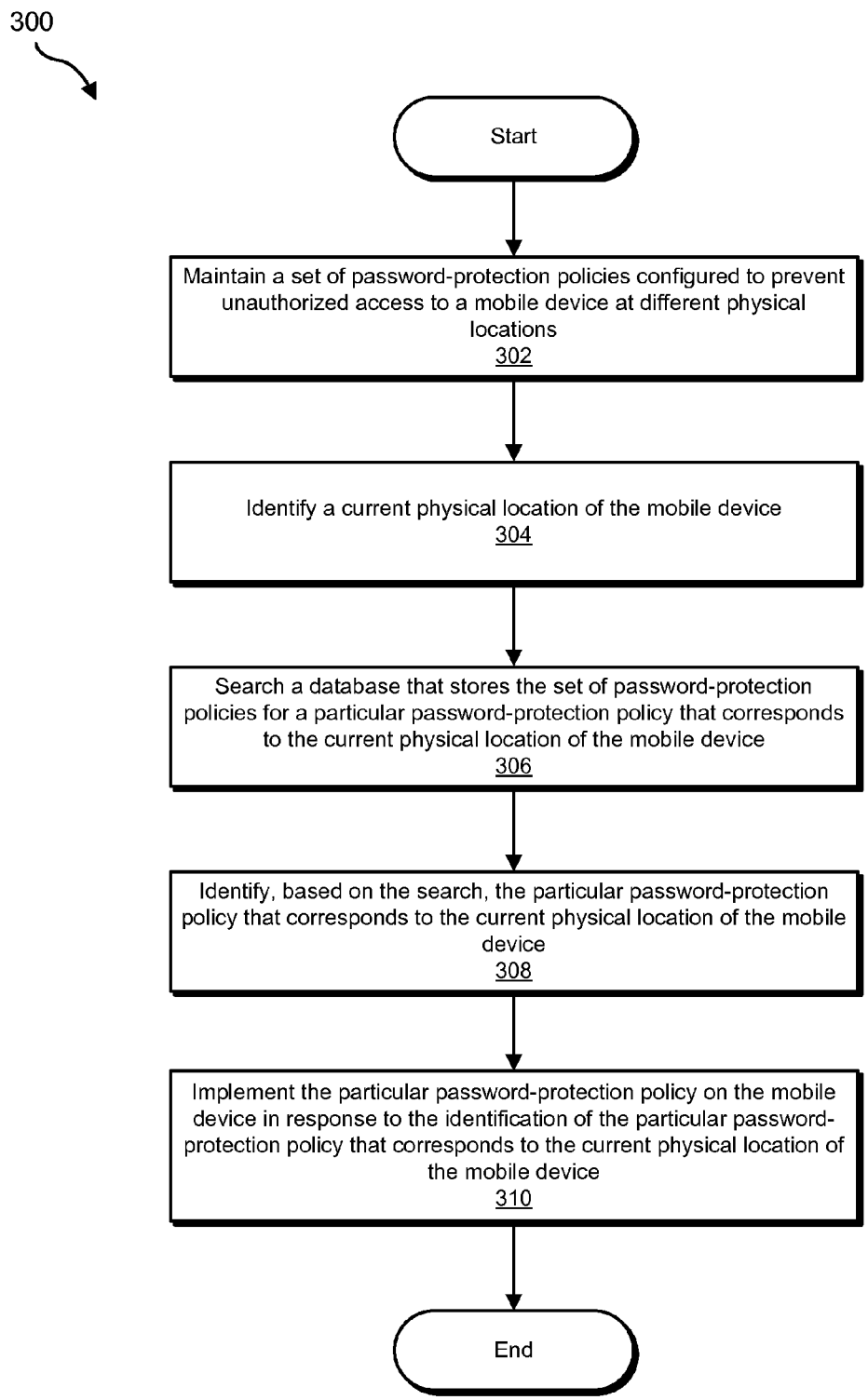
FIG. 3 is a flow diagram of an exemplary method for implementing password-protection policies based on physical locations of mobile devices.

FIG. 3 is a flow diagram of an exemplary computer-implemented method 300 for implementing password-protection policies based on physical locations of mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated at step 302 in FIG. 3, one or more of the various systems described herein may maintain a set of password-protection policies configured to prevent unauthorized access to a mobile device at different physical locations. For example, policy-provisioning module 104 may, as part of computing device 202 in FIG. 2, maintain password-protection policies 122(1)-(N) in policy database 120 stored on server 206. In this example, password-protection policies 122(1)-(N) may be configured to prevent unauthorized access to computing device 202 at different physical locations.

The phrase "password-protection policy," as used herein, generally refers to any collection of one or more rules or instructions related to controlling access to certain contents and/or features of a mobile device (such as computing device 202). In some examples, one or more of password-protection policies 122(1)-(N) may be configured to prevent unauthorized access to computing device 202 by requiring entry of a known password when computing device 202 is located at an untrusted physical location. Examples of such untrusted physical locations include, without limitation, public locations, unknown locations, known locations that are not trusted by a user of computing device 202, and/or any other untrusted physical locations.

In addition, one or more of password-protection policies 122(1)-(N) may be configured to facilitate access to computing device 202 without requiring entry of a password when computing device 202 is located at a trusted physical location. Examples of such trusted physical locations include, without limitation, a home of the user of computing device 202, a workplace of the user of computing device 202, locations that are physically proximate to the user of computing device 202 (as determined, for example, based on a connection between a Bluetooth device associated with the user of computing device 202 and computing device 202), known locations that are trusted by the user of computing device 202, and/or any other trusted physical locations.

The systems described herein may perform step 302 in a variety of ways. In some examples, policy-provisioning module 104 (as well as policy-enforcement module 106) installed on computing device 202 may represent part of a security application (such as a built-in or native security application) that controls access to certain contents and/or features of computing device 202. In one example, policy-provisioning module 104 may maintain one or more of password-protection policies 122(1)-(N) as preset or default policies included in the security application. For example, one or more of password-protection policies 122(1)-(N) may have been included in an installation package used to install the security application on computing device 202. As such, policy-provisioning module 104 may make one or more of password-protection policies 122(1)-(N) available to computing device 202 immediately upon installation of the security application.

Additionally or alternatively, policy-provisioning module 104 may receive an update that includes one or more of password-protection policies 122(1)-(N). For example, policy-provisioning module 104 may download one or more of pas sword-protection policies 122(1)-(N) from an online policy repository over the Internet (e.g., from server 206). In another example, policy-provisioning module 104 may obtain one or more of password-protection policies 122(1)-(N) from a computer-readable medium (such as a CD-ROM or a flash drive). Upon receiving this update that includes one or more of password-protection policies 122(1)-(N), policy-provisioning module 104 may make such password-protection policies available to computing device 202.

In some examples, policy-provisioning module 104 may maintain password-protection policies 122(1)-(N) by storing and/or managing password-protection policies 122(1)-(N) in policy database 120. For example, policy-provisioning module 104 may organize policy database 120 in to facilitate efficient, effective searching of password-protection policies 122(1)-(N). Policy-provisioning module 104 may also provide one or more of password-protection policies 122(1)-(N) to computing device 202 and/or enable computing device 202 to access one or more of password-protection policies (1)-(N) stored in policy database 120.

As shown in FIG. 2, policy-provisioning module 104 may, in some embodiments, be configured to maintain password-protection policies 122(1)-(N) in a separate server (e.g., server 206). In such embodiments, all or a portion of the functionality of policy-provisioning module 104 may be performed on server 206. For example, policy-provisioning module 104 may, as part of a server 206, in communication with computing device 202, maintain password-protection policies 122(1)-(N) in a policy database stored on the server. In such embodiments, policy-provisioning module 104 may be installed on server 206 and may make password-protection policies 122(1)-(N) available to computing device 202 via network 204.

As illustrated at step 304 in FIG. 3, one or more of the various systems described herein may identify a current physical location of the mobile device. For example, policy-enforcement module 106 may, as part of computing device 202 in FIG. 2, identify a physical location where computing device 202 is currently located. In some embodiments, the current physical location identified by computing device 202 may represent a current geolocation of computing device 202 or a physical structure (such as a building) in which computing device 202 is currently located. In other embodiments, the current physical location identified by computing device 202 may represent a relative distance between computing device 202 and the body of the user of computing device 202.

The systems described herein may perform step 304 in a variety of ways. In some examples, policy-enforcement module 106 may identify the current location of computing device 202 by detecting a wireless network associated with a particular physical location and then determining that computing device 202 is connected to the wireless network associated with the particular physical location. In one example, policy-enforcement module 106 may detect a wireless network associated with an untrusted physical location (such as a public location, an unknown location, or a known location that is not trusted by the user of computing device 202). For example, policy-enforcement 106 may detect a wireless network associated with a public building at a local university.

In another example, policy-enforcement module 106 may detect a wireless network associated with a trusted physical location (such as a home of the user of computing device 202, a workplace of the user of computing device 202, a location that is physically proximate to the user of computing device 202, or a known location that is trusted by the user of the computing device 202). For example, policy-enforcement module 106 may detect a wireless network known to be located at the home of the user of computing device 202.

In some examples, upon detecting the wireless network associated with the particular physical location, policy-enforcement module 106 may determine that computing device 202 is connected to the detected wireless network. Policy-enforcement module 106 may then extrapolate (or otherwise determine) the current physical location of computing device 202 based on this connection between computing device 202 and the detected wireless network. For example, if computing device 202 is connected to the wireless network associated with the public building at the local university, policy-enforcement module 106 may determine, based on the wireless network's association with the public building at the local university, that computing device 202 is currently located at the public building and/or that computing device 202 is currently located at an untrusted physical location. In another example, if computing device 202 is connected to the wireless network known to be located at the user's home, policy-enforcement module 106 may determine, based on the wireless network's association with the user's home, that the computing device 202 is currently located at the user's home and/or that computing device 202 is currently located at a trusted physical location.

In some examples, policy-enforcement module 106 may identify the current location of computing device 202 by obtaining geographical coordinates that identify the current physical location of the computing device 202. For example, policy-enforcement module 106 may receive a set of global positioning system (GPS) coordinates from a GPS device connected to or within computing device 202. In this example, these GPS coordinates received by policy-enforcement module 106 may identify the current physical location of computing device 202.

In certain examples, policy-enforcement module 106 may identify the current physical location of computing device 202 by detecting a Bluetooth device associated with the user of computing device 202 and then determining that computing device 202 is connected to the Bluetooth device associated with the user. This connection between computing device 202 and the Bluetooth device associated with the user may indicate or suggest that computing device 202 is located physically proximate to the user. Examples of such a Bluetooth device include, without limitation, a Bluetooth headset associated with the user, a Bluetooth speaker device (such as an in-car speakerphone) associated with the user, a Bluetooth-enabled gaming platform (such as SONY'S PLAYSTATION 3 and/or NINTENDO'S WII) associated with the user, a Bluetooth-enabled multimedia device (such as APPLE'S IPOD TOUCH) associated with the user, and/or any other Bluetooth device capable of being connected to computing device 202.

In one example, computing device 202 may have been configured to automatically connect to a Bluetooth headset known to be associated with the user of computing device 202. For example, the user of computing device 202 may have paired computing device 202 with the Bluetooth headset such that computing device 202 and the Bluetooth headset automatically connect when both devices are powered on and located within a predefined spatial range of one another. In this example, policy-enforcement module 106 may detect the Bluetooth headset associated with the user of computing device 202 and then determine that computing device 202 is connected to the Bluetooth headset. Policy-enforcement module 106 may also determine, based on this connection between computing device 202 and the Bluetooth headset, that computing device 202 is located on or near the user's body.

Figure 4:
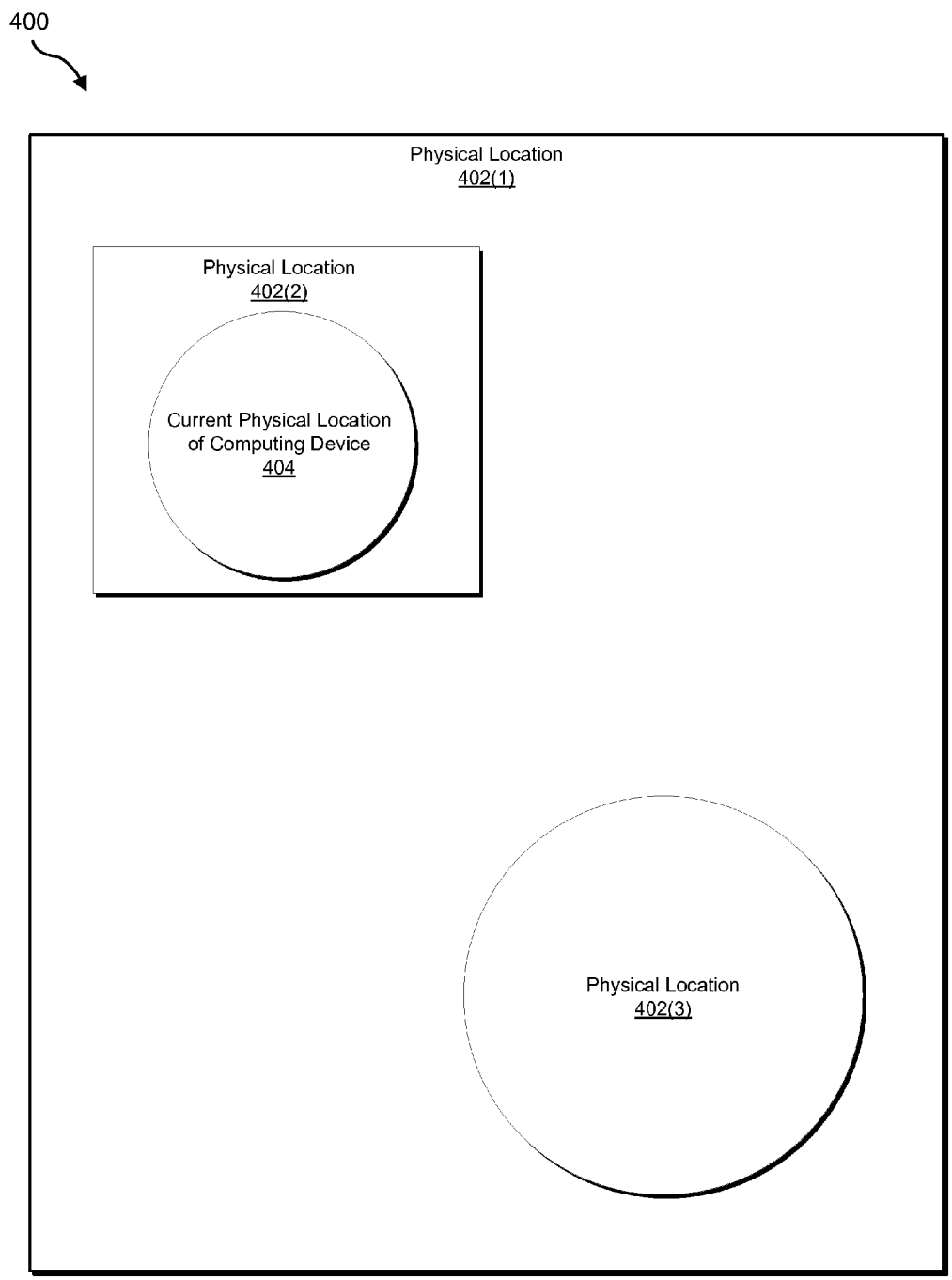
FIG. 4 is an illustration of an exemplary current location of a mobile device in relation to multiple exemplary physical locations within an exemplary area.

FIG. 4 is an illustration of an exemplary current location 404 of a computing device in relation to multiple exemplary physical locations 402(1)-(3) within an exemplary area 400. In one example, area 400 may represent a geographical area (e.g., a city, a building, etc.), and current physical location 404 may represent the current physical location of computing device 202. In this example, physical location 402(2) may represent a home of the user of computing device 202, and physical location 402(3) may represent a workplace of the user of computing device 202.

In one example, physical location 402(1) may represent any remaining portion of area 400 that has not been defined by the user as part of physical locations 402(2)-(3). For example, if physical locations 402(2)-(3) represent the user's home and workplace, physical location 402(1) may represent all of the geographic area that is located inside of area 400 but outside of the user's home and workplace.

As illustrated at step 306 in FIG. 3, one or more of the various systems described herein may search a database that stores the set of password-protection policies for a particular password-protection policy that corresponds to the current physical location of the mobile device. For example, policy-enforcement module 106 may, as part of computing device 202 in FIG. 2, search policy database 120 for a particular password-protection policy that corresponds to the current physical location of computing device 202 identified in step 304.

The systems described herein may perform step 306 in a variety of ways. In one example, as illustrated in FIG. 4, the relationship between current physical location 404 of the computing device and physical location 402(2) may indicate that computing device 202 is currently located at or within physical location 402(2). In this example, since this relationship indicates that computing device 202 is currently located at physical location 402(2), policy-enforcement module 106 may search password-protection policies 122(1)-(N) in an attempt to identify a particular password-protection policy configured to be implemented on computing device 202 when computing device 202 is located at physical location 402(2).

Figure 5:
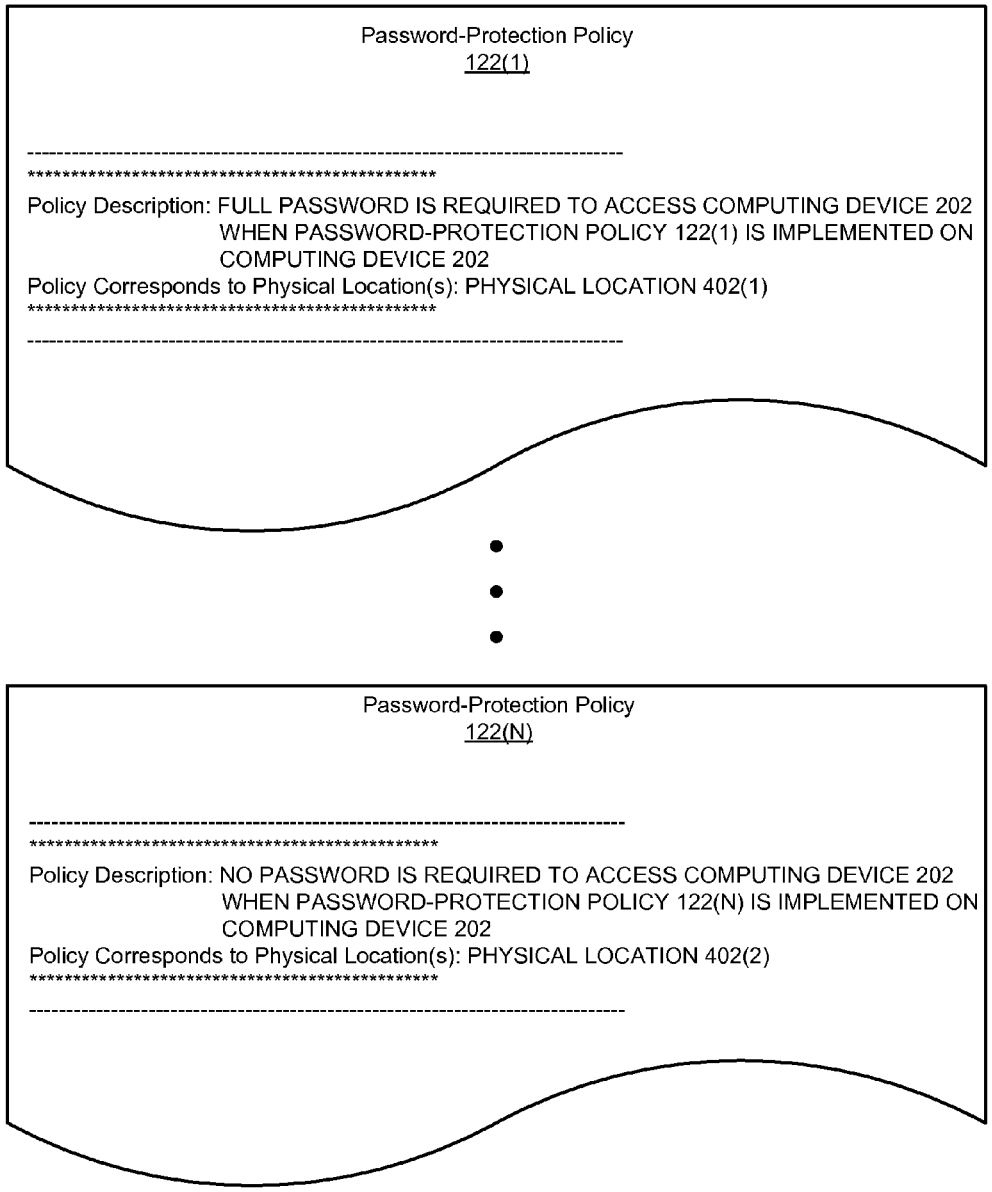
FIG. 5 is an illustration of exemplary password-protection policies.

FIG. 5 is an illustration of exemplary password-protection policies 122(1)-(N) that each includes information describing the policy in question and identifying at least one physical location that corresponds to the policy in question. For example, password-protection policy 122(1) may include information that indicates whether this policy requires entry of a password (in this example, "FULL PASSWORD IS REQUIRED TO ACCESS COMPUTING DEVICE 202 WHEN PASSWORD-PROTECTION POLICY 122(1) IS IMPLEMENTED ON COMPUTING DEVICE 202") and information that identifies at least one physical location that corresponds to this policy (in this example, "PHYSICAL LOCATION 402(1)"). Similarly, password-protection policy 122(N) may include information that indicates whether this policy requires entry of a password (in this example, "NO PASSWORD IS REQUIRED TO ACCESS COMPUTING DEVICE 202 WHEN PASSWORD-PROTECTION POLICY 122(N) IS IMPLEMENTED ON COMPUTING DEVICE 202") and information that identifies at least one physical location that corresponds to this policy (in this example, "PHYSICAL LOCATION 402(2)").

In this example, password-protection policies 122(1)-(N) may be configured to be implemented on computing device 202 at different physical locations. For example, password-protection policy 122(1) may be configured to be implemented on computing device 202 when computing device 202 is located at or within physical location 402(1), and password-protection policy 122(N) may be configured to be implemented on computing device 202 when computing device 202 is located at or within physical location 402(2).

In addition, although not illustrated in FIG. 5, such password-protection policies may, in some embodiments, include information that identifies whether the policy in question corresponds to a trusted physical location or an untrusted physical location. For example, a password-protection policy configured to require entry of a password (such as password-protection policy 122(1) in FIG. 5) may include information indicating that this policy corresponds to an untrusted physical location. Similarly, a password-protection policy configured to facilitate access to computing device 202 without requiring entry of a password (such as password-protection policy 122(N) in FIG. 5) may include information indicating that this policy corresponds to a trusted physical location.

As illustrated at step 308 in FIG. 3, one or more of the various systems described herein may identify, based on the search of the database, the particular password-protection policy from the set of password-protection policies that corresponds to the current physical location of the mobile device. For example, policy-enforcement module 106 may, as part of computing device 202 in FIG. 2, identify password-protection policy 122(N) as being the particular password-protection policy that corresponds to current physical location 404 of computing device 202. In this example, policy-enforcement module 106 may use the results of the search of policy database 120 performed in step 306 to facilitate determining that password-protection policy 122(N) corresponds to current physical location 404 of computing device 202.

The systems described herein may perform step 308 in a variety of ways. In one example, policy-enforcement module 106 may identify password-protection policies 122(1)-(N) stored in policy database 120 and then may determine the physical location(s) associated with each of password-protection policies 122(1)-(N). In this example, policy-enforcement module 106 may compare the physical location(s) associated with each of password-protection policies 122(1)-(N) to current physical location 404 of computing device 202. Policy-enforcement module 106 may determine whether current physical location 404 of computing device 202 is within the boundaries of a physical location corresponding to a password protection policy and/or is otherwise associated with the physical location corresponding to password protection policy. In one example, policy-enforcement module 106 may then determine, based on this comparison, that password-protection policy 122(N) corresponds to physical location 402(2).

As described in greater detail above, policy-enforcement module 106 may also determine that computing device 202 is currently located at physical location 402(2). As such, since password-protection policy 122(N) corresponds to the same physical location where computing device 202 is currently located, policy-enforcement module 106 may determine that password-protection policy 122(N) corresponds to current physical location 404 of computing device 202.

In some examples, policy-enforcement module 106 may identify and/or verify whether current physical location 404 of computing device 202 is a trusted physical location or an untrusted physical location. For example, although not illustrated in FIG. 4, password-protection policy 122(N) may include information indicating that this policy corresponds to physical location 402(2) and that physical location 402(2) is a trusted physical location. Policy-enforcement module 106 may then determine that, since computing device 202 is currently located at or within physical location 402(2) and physical location 402(2) is a trusted physical location, current physical location 404 of computing device 202 is a trusted physical location.

In another example, although not illustrated in FIG. 4, password-protection policy 122(1) may include information indicating that this policy corresponds to physical location 402(1) and that physical location 402(1) is an untrusted physical location. In this example, if computing device 202 were located at physical location 402(1) instead of physical location 402(2), policy-enforcement module 106 may determine that current physical location 404 is an untrusted physical location since computing device 202 is currently located at physical location 402(1) and physical location 402(1) is an untrusted physical location.

In one example, if policy-enforcement module 106 identified current physical location 404 of computing device 202 based on geographical coordinates, policy-enforcement module 106 may identify the particular password-protection policy in policy database 120 by identifying a geographical area associated with the particular password-protection policy. For example, although not illustrated in FIG. 4, password-protection policy 122(N) may include information that identifies three or more geographical points that define the boundaries of the geographical area associated with password-protection policy 122(N). In one embodiment, these geographical points that define the boundaries of the geographical area may represent points that were previously determined based on input received from the user of computing device 202. In another embodiment, these geographical points may represent points that have been downloaded from an online repository that stores such predetermined geographical data in relation to password-protection policies 122(1)-(N).

In this example, policy-enforcement module 106 may determine that the geographical coordinates that identify current physical location 404 of computing device 202 indicate that computing device 202 is currently located within the boundaries of the geographical area associated with password-protection policy 122(N). Policy-enforcement module 106 may then determine that password-protection policy 122(N) corresponds to current physical location 404 of computing device 202 based on the relationship between the geographical coordinates and the geographical area associated with password-protection policy 122(N).

As illustrated at step 310 in FIG. 3, one or more of the various systems described herein may implement the particular password-protection policy on the mobile device in response to the identification of the particular-password policy that corresponds to the current physical location of the mobile device. For example, policy-enforcement module 106 may, as part of computing device 202 in FIG. 2, implement password-protection policy 122(N) on computing device 202 in response to determining that password-protection policy 122(N) identified in step 308 corresponds to current physical location 404 of computing device 202.

The systems described herein may perform step 310 in a variety of ways. In one example, policy-enforcement module 106 may implement password-protection policy 122(N) on computing device 202 by causing computing device 202 to follow the rules or instructions included in password-protection policy 122(N). For example, policy-enforcement module 106 may implement password-policy 122(N) on computing device 202 such that the user of computing device 202 is able to access certain contents and/or features (e.g., all features and/or contents, a subset of features and/or contents, etc.) of computing device 202 without entering a password.

In another example, if computing device 202 were located at physical location 402(1) instead of physical location 402(2), policy-enforcement module 106 may cause computing device 202 to follow the rules or instructions included in password-protection policy 122(1) to control access to certain contents and/or features of computing device 202. For example, policy-enforcement module 106 may cause computing device 202 to require entry of a known password before the user is able to make a phone call with and/or access any data stored on computing device 202.

In some examples, upon identifying and/or verifying whether current physical location 404 of computing device 202 is a trusted physical location or an untrusted physical location, policy-enforcement module may implement the particular password-protection policy that corresponds to trusted physical locations or untrusted physical locations. For example, policy-enforcement module 106 may identify password-protection policy 122(N) as a password-protection policy that corresponds to trusted physical locations. In this example, if current physical location 404 of computing device 202 is a trusted physical location, policy-enforcement module 106 may implement password-protection policy 122 (N) on computing device 202 because password-protection policy 122(N) corresponds to trusted physical locations. As part of implementing password-protection policy 122(N) on computing device 202, policy-enforcement module 106 may enable the user of computing device 202 to access computing device 202 without entry of a password.

In another example, policy-enforcement module 106 may identify password-protection policy 122(1) as a particular password-protection policy that corresponds to untrusted physical locations. In this example, if current physical location 404 of computing device 202 were an untrusted physical location, policy-enforcement module 106 may implement password-protection policy 122(1) on computing device 202 because password-protection policy 122(1) corresponds to untrusted physical locations. As part of implementing password-protection policy 122(1) on computing device 202, policy-enforcement module 106 may require entry of a known password before the user is able to access certain contents and/or features of computing device 202. Upon completion of step 310 in FIG. 3, exemplary method 300 may terminate.

However, although not illustrated in FIG. 3, exemplary method 300 may also include one or more additional steps associated with implementing password-protection policies based on physical locations of mobile devices. In one example, policy-provisioning module 104 may receive input from the user of computing device 202. This input received from the user of computing device 202 may identify (or be used to identify) a particular physical location and a particular password-protection policy from the set of password-protection policies. For example, policy-provisioning module 104 may receive input from the user of computing device 202 that identifies physical location 402(2) and password-protection policy 122(N).

In this example, policy-provisioning module 104 may then update policy database 120 to indicate that computing device 202 is to implement password-protection policy 122(N) when computing device 202 is located at physical location 402(2). In other words, policy-provisioning module 104 may update password-protection policy 122(N) to indicate that password-protection policy 122(N) corresponds to physical location 402(2). By updating the database that stores the set of password-protection policies, policy-provisioning module 104 may enable the user of computing device 202 to associate each password-protection policy with at least one particular physical location.

In some examples, password-protection policies 122(1)-(N) may also include a password-protection policy that only requires entry of a shortened password (rather than a full-length password) before the user is able to access certain contents and/or features of computing device 202. In one example, this password-protection policy may correspond to a semi-trusted physical location (such as a house belonging to a close friend of the user) that is more trusted by the user than the untrusted physical locations but less trusted by the user than the trusted physical locations. For example, this password-protection policy may correspond to physical location 402(3) in FIG. 4. As such, although not illustrated in FIG. 4, if computing device 202 were currently located at physical location 402(3), policy-enforcement module 106 may implement the particular password-protection policy that only requires entry of the shortened password before the user is able to access computing device 202.

As another example, policy-enforcement module 106 may identify a policy that indicates, when computing device 202 is in an untrusted location, that multiple passwords and/or other authentication information must be provided. For example, a password protection policy may indicate that a user must perform a fingerprint scan and enter a password in untrusted locations, may only enter the password in semi-trusted locations, and may not need any authentication in trusted locations. Policy information module 106 may identify policies that require any combination of passwords, fingerprint scans, voice recognition technologies, retina scans, and/or other authentication mechanisms in untrusted and/or semi-trusted locations while requiring less stringent authentication in trusted locations.

In some examples, each of password-protection policies 122(1)-(N) may be configured to provide a different level of security on computing device 202. For example, password-protection policy 122(1) may be configured to provide a high level of security on computing device 202 when computing device 202 is located at physical location 402(1) in FIG. 4 (or a different untrusted physical location). In this example, password-protection policy 122(N) may be configured to provide a low level of security on computing device 202 when computing device 202 is located at physical location 402(N) in FIG. 4 (or a different trusted physical location). Similarly, password-protection policies 122(1)-(N) may also include various other password-protection policies that provide varying degrees of security on computing device 202.

Figure 6:
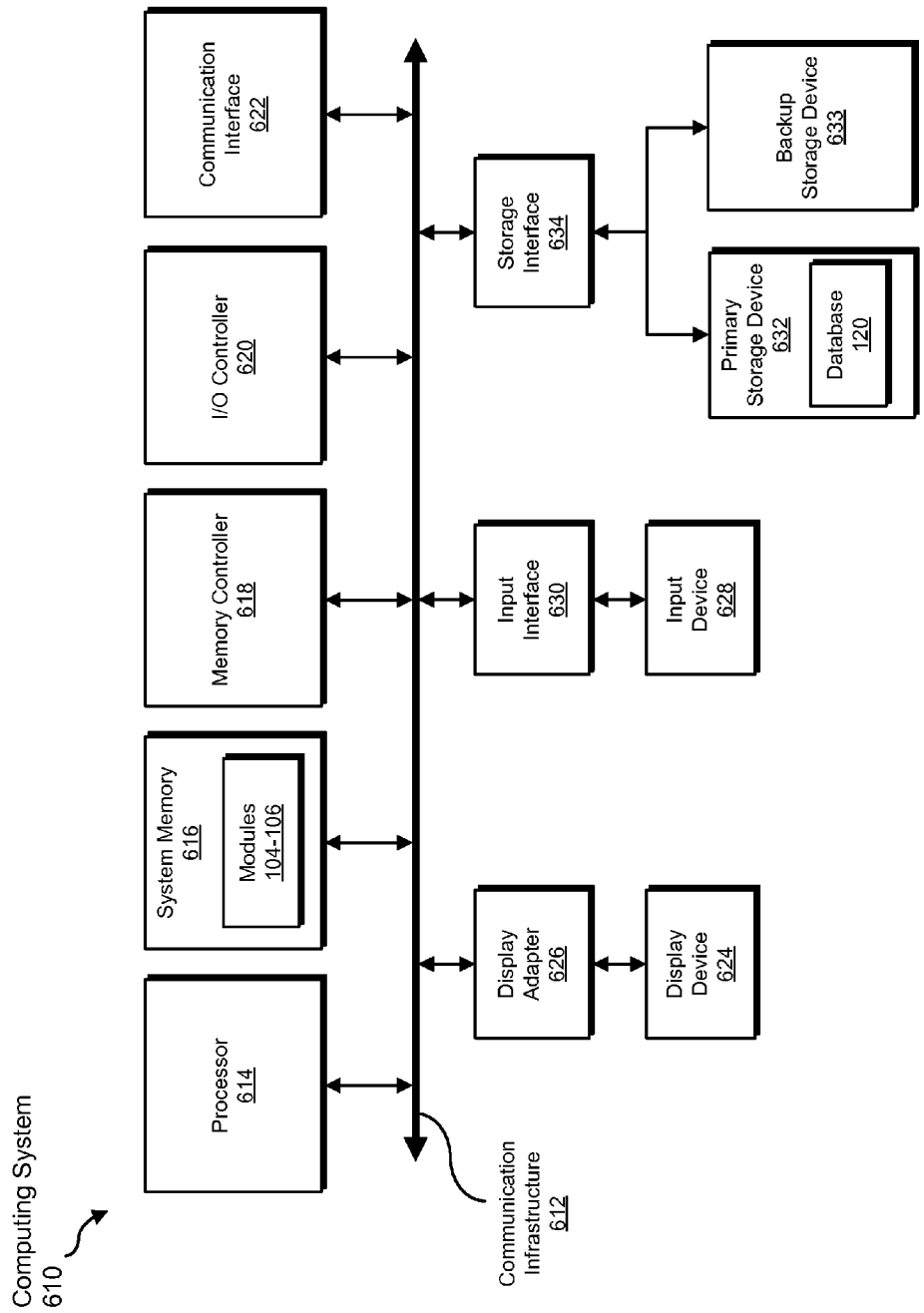
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the maintaining, identifying, searching, implementing, detecting, determining, obtaining, verifying, comparing, enabling, receiving, updating, and requiring steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, policy database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
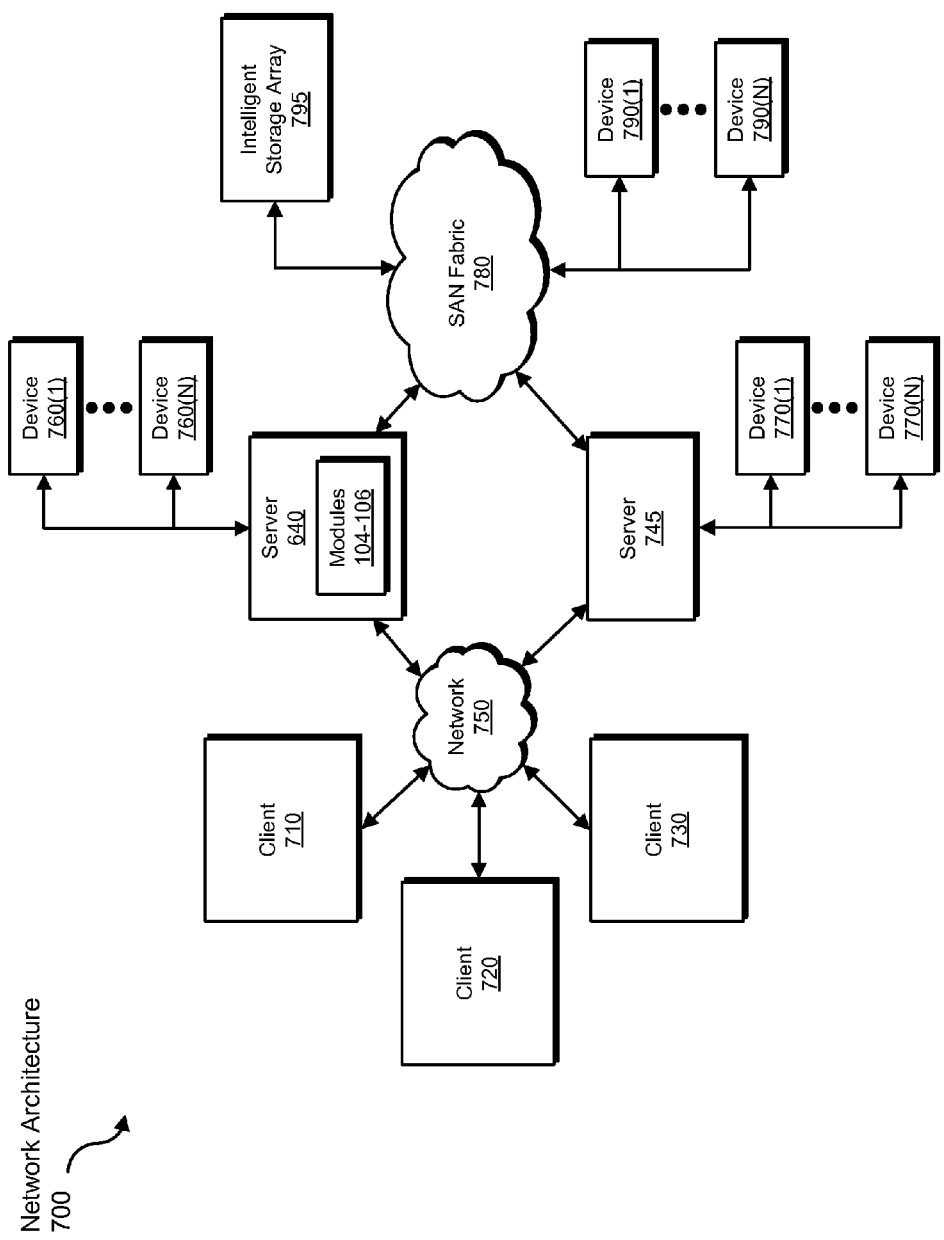
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the maintaining, identifying, searching, implementing, detecting, determining, obtaining, verifying, comparing, enabling, receiving, updating, and requiring steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for implementing password-protection policies based on physical locations of mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a characteristic or property of a physical device (such as computing device 202 in FIG. 2) by dynamically implementing different password-protection policies on the physical device as the physical device is moved to different physical locations.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for implementing password-protection policies based on physical locations of mobile devices, at least a portion of the method being performed by a computing device comprising at least one processor, the method comprising:
    maintaining a set of password-protection policies configured to provide varying degrees of security to a mobile device at different physical locations, the set of password-protection policies comprising:
        at least one password-protection policy that corresponds to at least one untrusted physical location;
        at least one password-protection policy that corresponds to at least one semi-trusted physical location;
        at least one password-protection policy that corresponds to at least one trusted physical location;
    receiving, from a user of the mobile device, input directed to associating a password-protection policy from the set of password-protection policies with a Bluetooth headset associated with the user of the mobile device;
    identifying, within a database that stores the set of password-protection policies, the password-protection policy based at least in part on the input received from the user of the mobile device;
    updating the database that stores the set of password-protection policies to indicate that the mobile device is to implement the identified password-protection policy when the mobile device is connected to the Bluetooth headset associated with the user of the mobile device:
    detecting the Bluetooth headset associated with the user of the mobile device;
    determining that the mobile device is connected to the Bluetooth headset associated with the user of the mobile device;
    in response to determining that the mobile device is connected to the Bluetooth headset associated with the user of the mobile device:
        searching the database that stores the set of password-protection policies for the password-protection policy that the mobile device is to implement when connected to the Bluetooth headset;
        identifying, based on the search of the database, the password-protection policy that the mobile device is to implement when connected to the Bluetooth headset;
        implementing the identified password-protection policy while the mobile device is connected to the Bluetooth headset.

2. The method of claim 1, wherein:
    the password-protection policy that corresponds to the untrusted physical location is configured to prevent unauthorized access to the mobile device by requiring a level of authentication that is more stringent than the password-protection policies that correspond to the semi-trusted and trusted physical locations;
    the password-protection policy that corresponds to the semi-trusted physical location is configured to prevent unauthorized access to the mobile device by requiring a level of authentication that is more stringent than the password-protection policy that corresponds to the trusted physical location but less stringent than the password-protection policy that corresponds to the untrusted physical location;
    the password-protection policy that corresponds to the trusted physical location is configured to facilitate access to the mobile device without requiring entry of a password when the mobile device is located at the trusted physical location.

3. The method of claim 2, wherein the untrusted physical location comprises at least one of:
    a public location;
    an unknown location;
    a known location that is not trusted by the user of the mobile device.

4. The method of claim 2, wherein the trusted physical location comprises at least one of:
    a home of the user of the mobile device;
    a workplace of the user of the mobile device;
    a location that is physically proximate to the user of the mobile device;
    a known location that is trusted by the user of the mobile device.

5. The method of claim 1, further comprising:
    receiving input from the user of the mobile device;
    identifying a particular physical location based at least in part on the input received from the user of the mobile device;
    identifying a particular password-protection policy within the database that stores the set of password-protection policies based at least in part on the input received from the user of the mobile device;
    updating the database that stores the set of password-protection policies to indicate that the mobile device is to implement the particular password-protection policy when the mobile device is located at the particular physical location.

6. The method of claim 1, wherein detecting the Bluetooth headset associated with the user of the mobile device comprises detecting a Bluetooth headset that has been paired with the mobile device such that the mobile device and the Bluetooth headset automatically connect to one another when the mobile device and the Bluetooth headset are located within a predefined spatial range of one another.

7. The method of claim 6, wherein determining that the mobile device is connected to the Bluetooth headset comprises detecting an automatic connection between the mobile device and the Bluetooth headset.

8. The method of claim 7, wherein determining that the mobile device is connected to the Bluetooth headset comprises:
   determining that the mobile device and the Bluetooth headset are located within the predefined spatial range of one another based at least in part on the automatic connection detected between the mobile device and the Bluetooth headset;
   determining that the mobile device is located physically proximate to the user since the mobile device and the Bluetooth headset are located within the predefined spatial range of one another.

9. The method of claim 8, wherein identifying the password-protection policy that corresponds to the trusted physical location comprises:
   identifying at least one trusted physical location associated with the password-protection policy;
   comparing the predefined spatial range within which the mobile device and the Bluetooth headset are located with the trusted physical location associated with the password-protection policy;
   determining, based on the comparison, that the predefined spatial range corresponds to the trusted physical location associated with the password-protection policy.

10. The method of claim 1, further comprising:
   determining that the mobile device is no longer connected to the Bluetooth headset associated with the user of the mobile device;
   upon determining that the mobile device is no longer connected to the Bluetooth headset:
      identifying a current physical location of the mobile device;
      searching the database that stores the set of password-protection policies for a password-protection policy that corresponds to the current physical location of the mobile device;
      identifying, based on the search of the database, the password-protection policy from the set of password-protection policies that corresponds to the current physical location of the mobile device;
      implementing the password-protection policy on the mobile device in response to the identification of the password-protection policy that corresponds to the current physical location of the mobile device.

11. The method of claim 10, wherein identifying the current physical location of the mobile device comprises:
   detecting a wireless network associated with a trusted physical location;
   determining that the mobile device is connected to the wireless network associated with the trusted physical location.

12. The method of claim 10, wherein identifying the current physical location of the mobile device comprises obtaining geographical coordinates that identify the current physical location of the mobile device.

13. The method of claim 12, wherein identifying the password-protection policy that corresponds to the current physical location of the mobile device comprises:
   identifying a geographical area associated with the password-protection policy;
   determining that the obtained geographical coordinates indicate that the mobile device is located within the geographical area associated with the password-protection policy.

14. The method of claim 10, wherein identifying the current physical location of the mobile device comprises:
   detecting a wireless network associated with an untrusted physical location;
   determining that the mobile device is connected to the wireless network associated with the untrusted physical location.

15. The method of claim 10, wherein identifying the password-protection policy that corresponds to the current physical location of the mobile device comprises verifying that the mobile device is located at a trusted physical location by:
   identifying at least one trusted physical location associated with the password-protection policy;
   comparing the current physical location of the mobile device with the trusted physical location associated with the password-protection policy;
   determining, based on the comparison, that the current physical location of the mobile device corresponds to the trusted physical location associated with the password-protection policy.

16. The method of claim 15, wherein implementing the password-protection policy on the mobile device comprises:
   implementing the password-protection policy that corresponds to the trusted physical location;
   upon implementing the password-protection policy that corresponds to the trusted physical location, enabling a user to access at least a portion of the mobile device without requiring entry of a password.

17. The method of claim 10, wherein identifying the password-protection policy that corresponds to the current physical location of the mobile device comprises verifying that the mobile device is located at an untrusted physical location by:
   identifying at least one untrusted physical location associated with the password-protection policy;
   comparing the current physical location of the mobile device with the untrusted physical location associated with the password-protection policy;
   determining, based on the comparison, that the current physical location of the mobile device corresponds to the untrusted physical location associated with the password-protection policy.

18. A system for implementing password-protection policies based on physical locations of mobile devices, the system comprising:
   a policy-provisioning module programmed to:
      maintain a set of password-protection policies configured to provide varying degrees of security to a mobile device at different physical locations, the set of password-protection policies comprising:
         at least one password-protection policy that corresponds to at least one untrusted physical location;
         at least one password-protection policy that corresponds to at least one semi-trusted physical location;
         at least one password-protection policy that corresponds to at least one trusted physical location;
      receive, from a user of the mobile device, input directed to associating a password-protection policy from the set of password-protection policies with a Bluetooth headset associated with the user of the mobile device;

identify, within a database that stores the set of password-protection policies, the password-protection policy based at least in part on the input received from the user of the mobile device;

update the database that stores the set of password-protection policies to indicate that the mobile device is to implement the identified password-protection policy when the mobile device is connected to a Bluetooth headset associated with the user of the mobile device;

a policy-enforcement module programmed to:
   detect the Bluetooth headset associated with the user of the mobile device;
   determine that the mobile device is connected to the Bluetooth headset associated with the user of the mobile device;
   in response to determining that the mobile device is connected to the Bluetooth headset associated with the user of the mobile device:
      search the database that stores the set of password-protection policies for the password-protection policy that the mobile device is to implement when connected to the Bluetooth headset;
      identify, based on the search of the database, the password-protection policy that the mobile device is to implement when connected to the Bluetooth headset;
      implement the identified password-protection policy while the mobile device is connected to the Bluetooth headset;

at least one hardware processor configured to execute the policy-provisioning module and the policy-enforcement module.

19. A non-transitory computer-readable-storage medium comprising one or more computer-executable instructions that, when executed by at least one processor of a computing device, cause the computing device to:

maintain a set of password-protection policies configured to provide varying degrees of security to a mobile device at different physical locations, the set of password-protection policies comprising:
   at least one password-protection policy that corresponds to at least one untrusted physical location;
   at least one password-protection policy that corresponds to at least one semi-trusted physical location;
   at least one password-protection policy that corresponds to at least one trusted physical location;

receive, from a user of the mobile device, input directed to associating a password-protection policy from the set of password-protection policies with a Bluetooth headset associated with the user of the mobile device;

identify, within a database that stores the set of password-protection policies, the password-protection policy based at least in part on the input received from the user of the mobile device;

update the database that stores the set of password-protection policies to indicate that the mobile device is to implement the identified password-protection policy when the mobile device is connected to a Bluetooth headset associated with the user of the mobile device;

detect the Bluetooth headset associated with the user of the mobile device;

determine that the mobile device is connected to the Bluetooth headset associated with the user of the mobile device;

in response to determining that the mobile device is connected to the Bluetooth headset associated with the user of the mobile device:
   search the database that stores the set of password-protection policies for the password-protection policy that the mobile device is to implement when connected to the Bluetooth headset;
   identify, based on the search of the database, the password-protection policy that the mobile device is to implement when connected to the Bluetooth headset;
   implement the identified password-protection policy while the mobile device is connected to the Bluetooth headset.

* * * * *

UNITED STATES PATENT AND TRADEMARK OFFICE
CERTIFICATE OF CORRECTION

PATENT NO. : 8,869,305 B1  
APPLICATION NO. : 13/240929  
DATED : October 21, 2014  
INVENTOR(S) : Ge Hua Huang Page 1 of 1

It is certified that error appears in the above-identified patent and that said Letters Patent is hereby corrected as shown below:

In the Claims,

Claim 1, at column 19, lines 61 to 65, should read:
updating the database that stores the set of password-protection policies to indicate that the mobile device is to implement the identified password-protection policy when the mobile device is connected to the Bluetooth headset associated with the user of the mobile device;

Signed and Sealed this  
Eighteenth Day of August, 2015

Michelle K. Lee  
*Director of the United States Patent and Trademark Office*